US010427081B1

(12) United States Patent
Newman et al.

(10) Patent No.: US 10,427,081 B1
(45) Date of Patent: Oct. 1, 2019

(54) DRUM VENT FILTER WITH PRESSURE INDICATOR/STOP ASSEMBLY

(71) Applicant: Newman IP LLC, Englewood, CO (US)

(72) Inventors: Ralph R. Newman, Denver, CO (US); Raymond J. Krebs, Jr., Littleton, CO (US); Lucas J. Van Alstyne, Centennial, CO (US); Kory S. Mehrer, Elizabeth, CO (US)

( * ) Notice: Subject to any disclaimer, the term of this patent is extended or adjusted under 35 U.S.C. 154(b) by 162 days.

(21) Appl. No.: 15/675,320

(22) Filed: Aug. 11, 2017

(51) Int. Cl.
*B01D 53/04* (2006.01)
*B01D 46/24* (2006.01)
*B01D 46/00* (2006.01)
*B09B 3/00* (2006.01)

(52) U.S. Cl.
CPC ...... *B01D 46/2411* (2013.01); *B01D 46/0005* (2013.01); *B01D 46/0031* (2013.01); *B01D 46/0036* (2013.01); *B09B 3/0058* (2013.01); *B09B 2220/02* (2013.01)

(58) Field of Classification Search
CPC ............ B01D 46/2411; B01D 46/0005; B01D 46/0031; B01D 46/003; B01D 46/0036; B01D 52/04; B01D 52/0446; B01D 2259/4525; B09B 3/0058; B09B 2220/02
USPC ....... 96/117.5, 134, 138, 139, 148; 55/385.4
See application file for complete search history.

(56) References Cited

U.S. PATENT DOCUMENTS

| | | | | |
|---|---|---|---|---|
| 2,603,308 A * | 7/1952 | McCall | ............. | B60K 15/0406 220/372 |
| 4,182,384 A * | 1/1980 | Zehr | ...................... | A62C 13/76 141/363 |
| 4,254,731 A * | 3/1981 | Taylor | .................. | B01D 35/143 116/268 |
| 4,612,026 A * | 9/1986 | Pollara | ................... | B01D 53/02 96/117.5 |
| 4,689,057 A * | 8/1987 | Gasper | ................. | B01D 53/261 55/385.1 |
| 5,193,709 A * | 3/1993 | Brassell | ............. | B65D 51/1616 137/545 |
| 5,284,997 A | 2/1994 | Spearman | | |
| 6,217,639 B1 * | 4/2001 | Jackson | ............. | B01D 53/0415 55/385.4 |
| 6,395,068 B1 * | 5/2002 | Rooney | .............. | B01D 53/0415 137/589 |
| 6,422,273 B1 * | 7/2002 | Campbell | ............. | B09B 3/0058 141/330 |
| 8,753,436 B1 * | 6/2014 | Curtsinger | ........... | B01D 46/001 55/318 |
| 2004/0045435 A1 * | 3/2004 | Golner | ............... | B01D 53/0407 95/117 |
| 2007/0101864 A1 * | 5/2007 | Nakanoya | ............... | F17C 13/04 96/108 |
| 2007/0131111 A1 * | 6/2007 | Hart | ................... | B01D 53/0407 95/146 |
| 2011/0016733 A1 | 1/2011 | Peretti | | |
| 2015/0040765 A1 * | 2/2015 | Zastera | ............. | B01D 53/0415 96/117.5 |
| 2015/0273379 A1 * | 10/2015 | McVay | ............. | B01D 46/0038 96/108 |

(Continued)

*Primary Examiner* — Frank M Lawrence, Jr.
(74) *Attorney, Agent, or Firm* — Reilly Intellectual Property Law Firm

(57) ABSTRACT

An apparatus and method for removal of contaminants from vented vapors having a pressure indicator/stop assembly.

20 Claims, 4 Drawing Sheets

(56) References Cited

U.S. PATENT DOCUMENTS

2015/0273384 A1  10/2015  Campbell
2016/0325222 A1  11/2016  Campbell

* cited by examiner

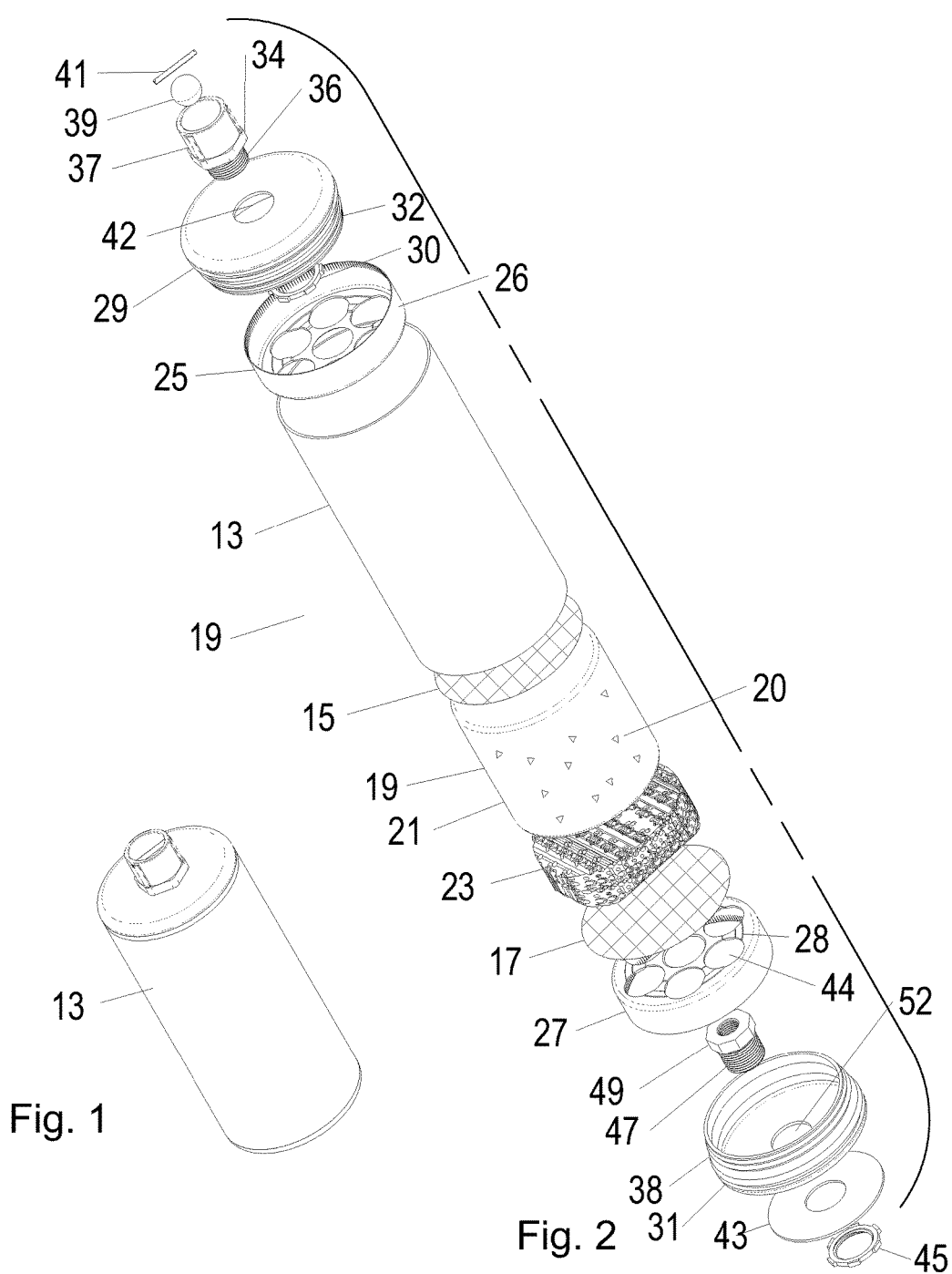

DRUM VENT FILTER WITH PRESSURE INDICATOR/STOP ASSEMBLY

FIELD

The present device relates to a drum vent filter assembly for separation of liquids and gases. In particular, it relates to a recyclable and reusable apparatus for drum vent filtration with a pressure indicator/stop assembly and a method for drum vent filtration with a pressure alert/stop assembly.

BACKGROUND

Aerosol containers, by law must be disposed of properly as they are considered to be toxic waste. Current law requires depressurization, evacuation and disposal of pressurized, spent containers as hazardous waste. In order to accomplish this, there are systems available for evacuation and disposal of the contents of spent aerosol containers. One such system is the Aerovent® which removes liquid from the aerosol containers prior to disposal. The Aerovent® is mounted on top of the drum and is designed to puncture and remove gases and residue materials from a pressurized container and eject them into the storage drum. A form of filter assembly is used to accompany the Aerovent® to allow for capture of harmful vapors and VOC's. One problem presented with the removal system is ensuring adequate evacuation of the aerosol container prior to removal of the container from the Aerovent®. It is extremely difficult to determine whether the container has been emptied of all contents and an aerosol can may be removed prematurely while the container is still under pressure. The current device provides for an apparatus that captures harmful vapors and VOC's while also alerting the user when the cycle for removal is complete and providing a stop or check valve assembly.

SUMMARY

The following device and method of contaminant removal from a storage container is set forth as follows. There is provided an improved filter cartridge assembly for securement to a drum vent having a recyclable open-ended housing sized to accommodate a liquid and VOC separation assembly, the separation assembly having an adsorption member and at least one diffusion plate, upper and lower end caps, and a stop assembly. The assembly may include upper and lower diffusion plates having circumferentially spaced openings with optional wire mesh inserts and a coalescing member preferably used in conjunction with the adsorption member. The stop assembly acts as a pressure indicator as well as a vent stop and is preferably defined by a translucent tube, check ball, seat member and stop member. The method of venting and separating contaminants from a propellant has the steps of mounting a filter cartridge on a storage container that contains propellant, dispersing the propellant with a diffusion member, separating liquid from gas in the propellant, filtering upwardly travelling vapors with an adsorption member, and indicating the pressure status of the storage container. The housing and filtration components of the filter cartridge may be replaced and the end cap members may be re-used.

BRIEF DESCRIPTION OF THE DRAWINGS

The accompanying drawings, which are incorporated and which constitute a part of the specification, illustrate at least one embodiment of the present device.

FIG. 1 is a perspective view of a filter assembly;
FIG. 2 is an exploded perspective view of FIG. 1.

DETAILED DESCRIPTION

Figure 6:
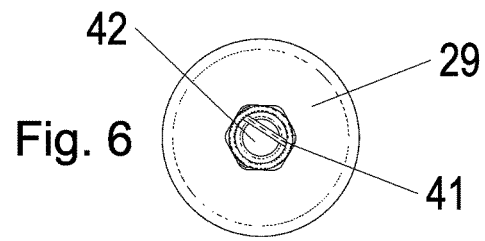
FIG. 6 is a top view of FIG. 1.
Figure 3:
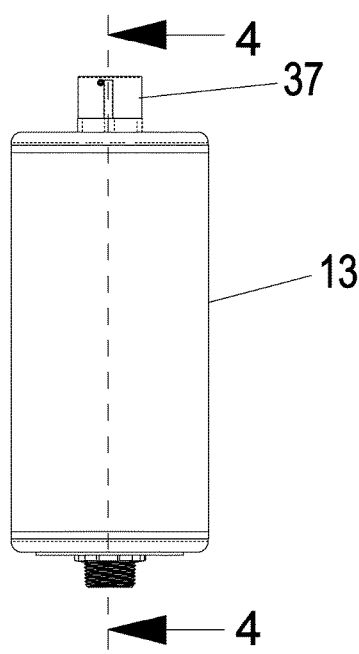
FIG. 3 is a side view of FIG. 1.
Figure 4:
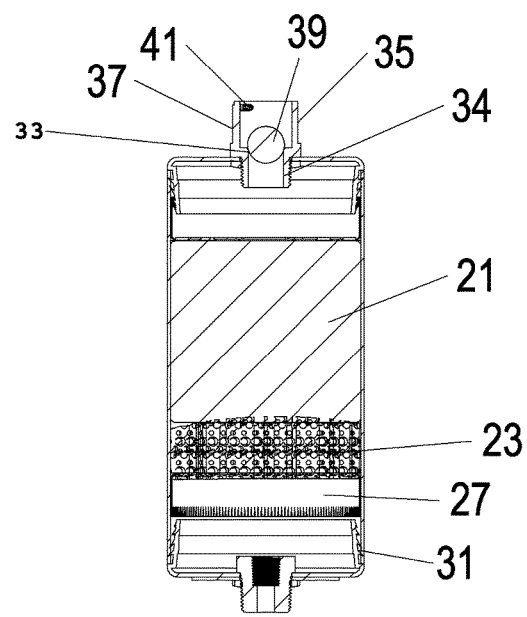
FIG. 4 is a cross-sectional view about lines 4-4 of FIG. 3.
Figure 5:
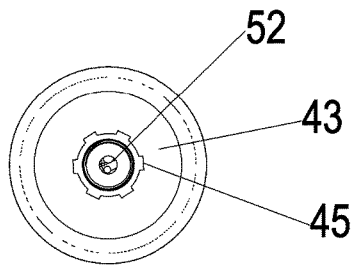
FIG. 5 is a bottom view of FIG. 1.
Figure 7:
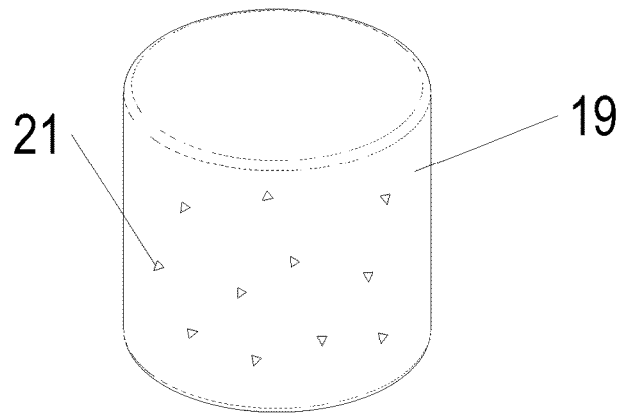
FIG. 7 is a perspective view of a filtration component shown in FIG. 2.
Figure 8:
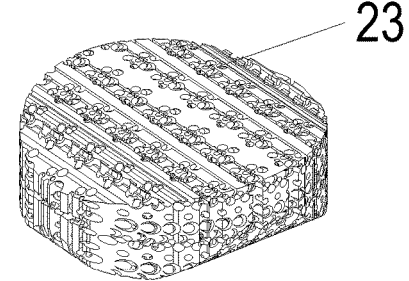
FIG. 8 is a perspective view of a coalescing element shown in FIG. 2.
Figure 9:
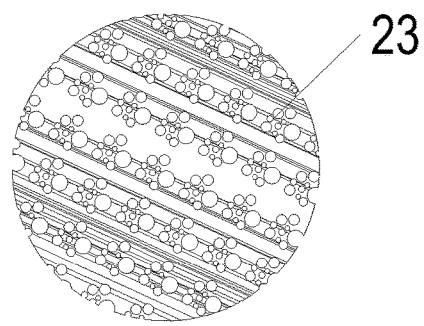
FIG. 9 is a top view of FIG. 8.
Figure 10:
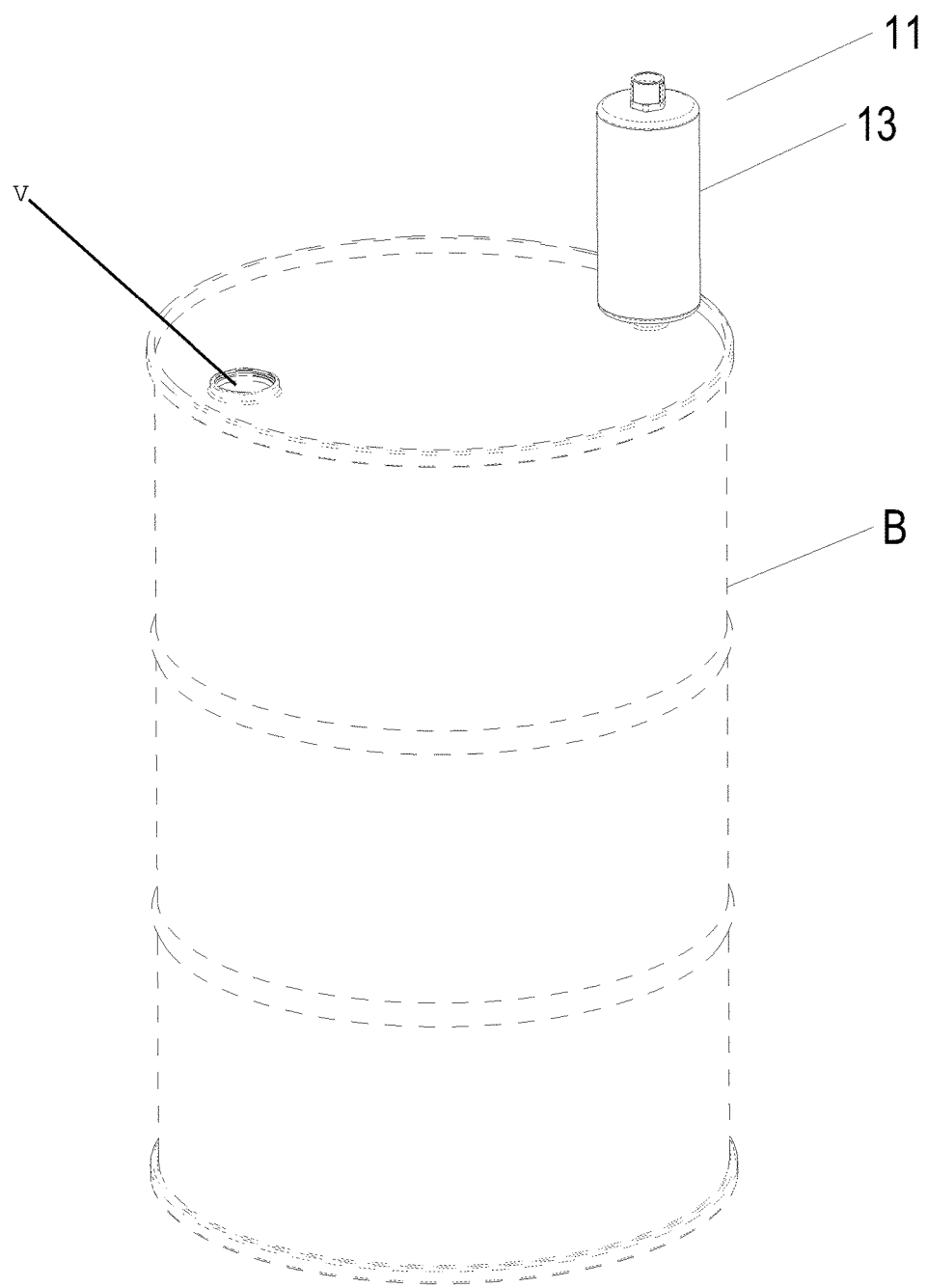
FIG. 10 is a view showing the filter assembly shown in FIG. 1 mounted on a drum.

A filter cartridge assembly with a pressure indicator 11 is provided and shown in FIGS. 1-10. The overall assembly is made up of an external cylindrical housing 13, providing a recyclable housing for internal cartridge elements such dual diffuser plates 25 and 27, internal upper screen 15, internal lower screen 17, sleeve member 19 containing activated carbon 21 forming a filtration member 20, and preferably a coalescing element 23. The housing is sealed with a top cap 29 having a ribbed collar 32 and a lower cap 31 with a ribbed collar 38. A check ball assembly 35 is mounted on the top cap 29 with a threaded neck 36 and a securing member 30. The external housing 13 has uniform, circumferentially extending walls and is sized to accommodate the liquid and VOC separation assembly. The housing 13 has dual open ends which accommodate the upper and lower caps 29 and 31.

The upper diffusion plate 25 seals the upper portion of the housing or cartridge, keeping the filter and any other components, such as the coalescing member in place and consolidating the flow of gases from the cartridge into a single opening 42 while also providing an interface between the carbon filter 20 to the pressure indicator/stop assembly 35.

The check ball assembly or pressure indicator/stop assembly 35 preferably includes a translucent tube 37 but the form of pressure alert may have a different form such as a cage style (not shown), a transition lip 34 to retain the tube 37 in place, a check ball 39, a threaded member 36, a check ball retainer 41 as well as a seat member 33. The check ball assembly 35 is designed to act as a pressure indicator for the storage container, alerting the user when the aerosol can is depressurized and safe to remove. It is also used to indicate when the storage container or drum is completely depressurized and safe to open. Further, the check ball assembly may comply with OSHA, EPA and certain state regulations requiring the storage drum to be closed after processing to prevent vapors from escaping into the atmosphere. The check ball assembly acts as a stop assembly or check valve when the ball member 39 is resting in the seat member 33, thereby closing the system. The check ball assembly may have a different form, such as a cone shaped assembly with an indicator element (not shown) without departing from the disclosed form.

The ball member is preferably of stainless steel, aluminum or some form of smooth, non-corrosive material. The weight of the ball will determine the amount of movement under pressure as the ball 39 contained within the assembly will move upwardly if gases are under pressure. The ball member will remain in the seat 33 if gases are not present. The preferred form of material for the tube 37 is a clear plastic to allow for easy visibility of the ball member. The translucent tube may also be formed of shatterproof glass or an open cage. The check ball retainer or retainer member is preferably a length of metal, a screen member, a reduced neck in the tube 37 or a small pin that keeps the ball member retained within the tube 37 and the seat member 33 keeps the ball member from slipping into the cartridge.

The top cap 29 with the ribbed members 32, forms a snap fit with the housing 13, seals the upper portion of the filter assembly 13 and aids in consolidating the flow of gases from the cartridge into a single opening 42. The top cap 29 also provides an interface for joining the cartridge assembly with the check ball assembly 35. The top cap 29 is preferably press fit into the housing 13 and may be reused once it is determined that the maximum filter life has been reached. The upper and lower diffusion plates 25 and 27 may consist of plastic, metal or aluminum and one or more may be used with the system. The upper and lower diffusion plates have circumferential walls or a collar 26 that extend upwardly from the base 28 that has circumferentially spaced perforations 44. The location, size and shape of the perforations control the direction and amount of gas flow. The upper and lower diffusion plates may be snap fit, threaded or glued instead of press-fitting into the housing.

The upper and lower screens 15 and 17 are preferably co-extensive with the upper and lower diffusion plates. The upper screen 15 separates the activated carbon from the diffuser plate 25. The screen 15 acts as a redundant barrier to capture carbon dust and in combination with the diffusion plate 25, directs the flow of existing gases. The lower screen 17 acts as a separation member from the diffuser plate 27 and acts as a redundant barrier to capture carbon dust as well. Either screen may be made up of fabric instead of steel mesh and may be combined with the upper and lower diffusion plates. The coarseness of the screen may be varied to provide flow control as well as carbon dust capture.

The lower cap 31 with the external ribbing 38, seals a lower portion of the housing 13 creating a press-fit seal. The press-fit seal is important in that it allows for the end caps to separate from the system in case of extreme pressure build up. The lower cap assembly 31 provides an interface between the filter cartridge assembly and the drum fitting. The lower cap may be threaded or have a snap fit without departing from this embodiment and is reusable when the interior cartridges and housing are replaced. The lower cap 31 includes a backing plate 43, a lower panel nut 45 having a lower threaded fitting 47, and a securing member 49.

The lower panel nut 45 fastens the lower fitting 47 to the lower cap 31 and the backing plate 43. The backing plate 43 is preferably made of aluminum but may be comprised of other materials such as steel or plastic. The backing plate 43 provides support to the lower lid 31 during cartridge installation as well as providing a rigid surface to support the lower panel nut 45 and is secured to the lower lid 31 with the securing member 49. The lower fitting 47 fits into the bung of a standard 30-gallon or 55-gallon drum. The fitting 47 is preferably of chemical resistant polypropylene and the orifice size, ⅜" for example, controls the flowrate of gases entering the filter. The orifice size may be varied to control the flowrate into the filter. The lower fitting 47 may be comprised of brass or steel as well and could be adapted to fit into a 2" bung instead of a ¾" bung. It may also be combined with the lower cap 31 and/or the backing plate 43 and/or the lower panel nut 45. Further, the lower fitting 47 may also be modified to form a quick-connect adaptor.

The outer housing is preferably made of cellulose and is recyclable and approximately 96% biodegradable. The housing 13 may be of cylindrical configuration but other configurations may be used as well. Other materials may be used such as biodegradable plastic or molded pulp. The inner cartridge elements along with the housing is to be replaced over time, reusing the upper and lower caps and associated parts. The filter cartridge which includes the activated carbon and the sleeve member, may be easily removed and replaced with a new filter cartridge. The coalescing member or element extends the life of the filter cartridge by trapping liquid prior to entry into the adsorption level of filtration. It is designed to house the internal cartridge elements such as the diffusion plates 25, 27, the upper and lower screens 15, 17, the activated carbon and sleeve member 19, 21, as well as the coalescing element 23.

The optional coalescing element 23, as shown in FIGS. 2, 4, 8 and 9, preferably comprises chemical resistant stainless steel, but may be made up of other materials, which when exposed to fluids and entering gases, disrupts the flow of entering gases and captures entrained liquids prior to entering the activated carbon filter 20. This type of filter provides continuous removal of liquid contaminants from vapors and aids in prolonging the life of the assembly by trapping liquids prior to reaching the activated carbon filter 20, thereby extending the life of the filter. The entrained liquids form large droplets and they travel downwardly into the base of the filter assembly forming the lower cap 31. The coalescing member conforms to the inside of the housing 13 and is placed in advance of the carbon filtration member 20. The coalescing element may be made up of plastic or fabric material that has a variation of coarseness or surface area to control the flow of fluids and gases.

The filter 20 is preferably made up of activated carbon which is typically derived from coconut shell, bituminous or anthracite coal, and bone char. The activated carbon captures contaminants, generally VOC's, such as BTEX (benzene, toluene, ethylbenzene, xylene), hexane, cyclohexane, 1,2,4-trimethylbenzene, heptane, butane, and pentane through adsorption. The carbon particulates may be 0.5 to 50 micrometers and are placed in a mesh sleeve 19 that is designed to contain the carbon while allowing vapors to pass through for filtering purposes. Other filtration systems may be used without departing from the scope of disclosure.

In one form, the upper and lower diffusion plates 25 and 27 are inserted into the housing along with the wire mesh members 15 and 17. Sandwiched between the upper and lower diffusion plates are the activated carbon filter 20 and the coalescing element 23. The upper and lower caps 29 and 31 have central openings 42, 52, allowing vapor to pass through the system. The combination of these elements allows for a high flow rate through the housing, thereby minimizing the risk of over-pressurization of the drum during operation.

In use, the device 11 is secured to a vent member on a drum container, preferably, and once the Aerovent® or similar device is in use, the contents of the aerosol can will pass into the drum container. Once this occurs, propellant or vapor from the aerosol container must be vented through the vent member on the drum container. Vapor containing contaminants will pass through an opening 52 on the removable lower lid or cap 31 which acts as a concentrator and will enter the housing 13 through the lower diffusion plate 27 and the wire mesh screen 17 which aids in the removal of some contaminants and well as dispersing vapor as it travels upwardly. The vapor subsequently may pass through the coalescing member 23 which limits the flow of liquids into the adsorption member. The vapor then travels upwardly due to pressure into the activated carbon filter 20 for removal of hydrocarbons. The gas will travel upwardly through the upper wire mesh screen 15 and the upper diffusion plate 25, passing through the single opening 42, again which acts as a concentrator. The pressurized vapor will pass through the check ball assembly 35, causing the check ball 39 to move upwardly into contact with the retaining member 41, demonstrating that the system is still pressurized and the removal cycle is not yet complete.

Once the system has reached equilibrium and no further gas is being released into the drum container, the check ball 39 will rest in the lower portion of the assembly, the seat 33, and will remain seated along the lower portion of the tube until the system becomes pressurized again. Once the system is no longer pressurized, the user may remove the aerosol can from the system without concern regarding pressure. Further, the check ball assembly will also indicate the status of the drum container with regard to pressure so that dangerous situations may be avoided and may comply with OSHA, EPA and certain state regulations requiring the storage drum to be closed after processing to prevent vapors from escaping into the atmosphere. The check ball assembly acts as a stop assembly or check valve when the ball member 39 is resting in the seat member 33, thereby closing the system.

Once the assembly 11 has reached its useful life, generally 90 days or 600 spent cans, the upper lid 29 may be removed and the housing 11 containing the liquid/gas filtration assembly, may be easily removed, leaving the lower lid 31 and connection points with the drum bung in place. The housing 11 and associated contents can be replaced, re-using the upper and lower lids. Alternatively, a dual or multiple drum vent filter assembly may also be mounted on the drum vent with a specific mounting splitter device (not shown), to allow for high volumes of aerosol processing.

While the present method and apparatus have been described in connection with the illustrated embodiments, it will be appreciated and understood that modifications may be made without departing, from the true spirit and scope.

We claim:

1. An improved filter cartridge assembly for a drum vent, comprising,
   a recyclable open-ended housing sized to accommodate a liquid and VOC separation assembly;
   a separation assembly within said housing having an adsorption member and at least one diffusion plate;
   upper and lower end caps,
   a drum vent connection member; and
   a pressure indication assembly.

2. The filter cartridge assembly according to claim 1 wherein said separation assembly includes upper and lower diffusion plates having a coalescing member and said adsorption member located therebetween.

3. The filter cartridge assembly according to claim 1 wherein said adsorption member is defined by an activated carbon filter.

4. The filter cartridge assembly according to claim 3 wherein said carbon filter comprises activated carbon contained within a sleeve member.

5. The filter cartridge assembly according to claim 1 wherein said pressure indication assembly comprises a check ball assembly.

6. The filter cartridge assembly according to claim 5 wherein said check ball assembly is defined by a translucent tube, check ball, seat member and stop member.

7. The filter cartridge assembly according to claim 1 wherein said recyclable housing is made of cellulose.

8. The filter cartridge assembly according to claim 2 wherein said coalescing member is situated in advance of said adsorption member.

9. A liquid/gas filter assembly for removal of contaminants from a propellant storage container, comprising:
   a recyclable cylindrical housing having dual open ends;
   dual removable lids each having single venting members;
   at least one diffusion plate;
   an upper filtration member having activated carbon contained within a sleeve member;
   a container connection member; and
   a pressure indication assembly.

10. The liquid/gas filter assembly according to claim 9 wherein said housing circumferentially surrounds a coalescing member, said filtration member and said at least one diffusion plate.

11. The liquid/gas filter assembly according to claim 9 wherein said cylindrical housing comprises a cellulose material.

12. The liquid/gas filter assembly according to claim 9 wherein said at least one diffusion plate has a circumferential collar.

13. The liquid/gas filter assembly according to claim 9 wherein said at least one diffusion plate has circumferentially spaced openings.

14. The liquid/gas filter assembly according to claim 9 wherein said pressure indication assembly is defined by a translucent tube.

15. The liquid/gas filter assembly according to claim 14 wherein said pressure indication assembly includes a ball, seat member and retaining member within said translucent tube.

16. The liquid/gas filter assembly according to claim 9 wherein one of said dual lids has said container connection member.

17. A method of venting and separating contaminants from a propellant, the steps comprising:
   mounting a filter cartridge on a storage container that contains propellant;
   diffusing said propellant with a diffusion member;
   filtering upwardly travelling vapors with an adsorption member; and
   indicating the pressure status of said storage container with a pressure indicator.

18. The method according to claim 17 wherein said diffusion member includes a lower collared plate in which the propellant enters through circumferentially spaced perforations and a wire mesh.

19. The method according to claim 17 wherein the steps further include diffusing vapor through a secondary upper diffusion member.

20. The method according to claim 17 wherein the steps further include replacing a housing and filtration components of said filter cartridge and re-using end cap members.

* * * * *